United States Patent [19]

Krembel, Jr.

[11] 3,847,078
[45] Nov. 12, 1974

[54] PNEUMATICALLY OPERATED MARKING TOOL

[75] Inventor: Frank Krembel, Jr., St. Clair Shores, Mich.

[73] Assignee: Columbia Marking Tools, Inc., Detroit, Mich.

[22] Filed: Nov. 29, 1973

[21] Appl. No.: 420,074

[52] U.S. Cl. .............................. 101/3 R, 173/119
[51] Int. Cl. ............................................ B44b 5/00
[58] Field of Search ............ 101/3, 4, 18; 173/119, 173/120

[56] References Cited
UNITED STATES PATENTS

| | | | |
|---|---|---|---|
| 2,132,962 | 10/1938 | Mueller | 101/18 |
| 2,427,358 | 9/1947 | Kovach | 101/3 R |
| 2,883,927 | 4/1959 | Egbert | 101/4 |
| 3,160,090 | 12/1964 | Diegel | 101/18 |
| 3,739,863 | 6/1973 | Wohlwend | 173/119 |
| 3,762,484 | 10/1973 | Speicher | 101/3 R |

Primary Examiner—Robert E. Bagwill
Assistant Examiner—Paul J. Hirsch
Attorney, Agent, or Firm—Barnes, Kisselle, Raisch & Choate

[57] ABSTRACT

Piston rod in an outer cylinder transports a marking die to and from engagement with a workpiece. The piston rod is hollow and forms a second cylinder containing a pneumatically actuated ram. When the die is pressed against a workpiece the die holder pushes a valve member into the second cylinder displacing a head thereon from a valve seat to vent trapped air under pressure from the interior of the second cylinder; air under piston-advancing pressure is ported into the second cylinder causing the ram to advance and strike the valve head to mark the workpiece. Air under piston-retracting pressure is ported into the second cylinder to retract the ram, and the valve head is spring returned against the valve seat to close the vent. Seals trap air under pressure in the second cylinder to retain the ram in retracted position.

The vent comprises several elongate passageways around the shank of the valve member cooperating to form an expansion chamber for the venting air to reduce the noise level thereof.

35 Claims, 5 Drawing Figures

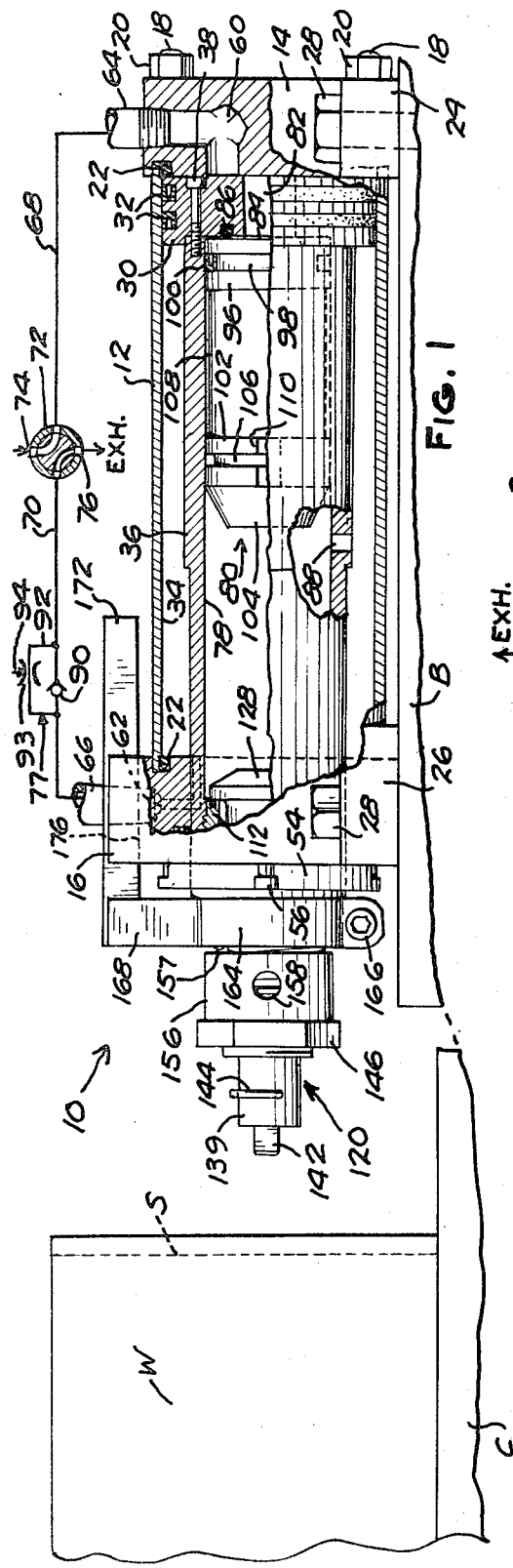

PNEUMATICALLY OPERATED MARKING TOOL

This invention relates to marking tools typically used to impress identifying marks or indicia on a succession of workpieces, for example on an automated production line.

A conventional marking tool of this type comprises basically a pneumatic cylinder and piston, a marking die being carried by the forward end of the piston rod. When a workpiece is positioned for marking, the piston is pneumatically advanced causing the die to strike and mark the workpiece. The piston is then retracted, in some cases by a spring and in some cases pneumatically. A conventional marking tool in itself is thus relatively simple and inexpensive.

However, in many installations the marking tool must be bodily advanced toward the workpiece to perform its work and then retracted from the work area to permit a conveyor or the equivalent to convey another workpiece to the marking station. The cost of a carrier for so moving the marking tool frequently exceeds by far the cost of the tool itself. This cost arises from the necessity for precision made moving parts (machined ways for example) and motor means for accurately positioning the marking tool at its work station.

The conventional marking tool is also too noisy to meet many present day sound environmental regulations and requirements. The objectionable noise arises both from the impact of the marking die against the work and from the air exhausting from the cylinder.

The object of the present invention is to provide a relatively simple inexpensive marking tool structure which is improved to provide its own carriage for advancing and retracting the marking mechanism relative to a work station and to function at a sound level which is nonhazardous to the ears of a human operator without protective gear. One form of the invention is shown in the accompanying drawings:

FIG. 1 is a view partly in elevation and partly in section of a marking tool according to the present invention with certain pneumatic circuitry shown diagrammatically.

FIG. 2 is a fragmentary enlarged scale generally sectional view of the structure shown in FIG. 1 with certain of the parts shown in a different position.

FIG. 3 is a sectional view on line 3—3 of FIG. 2.

Figure 4:
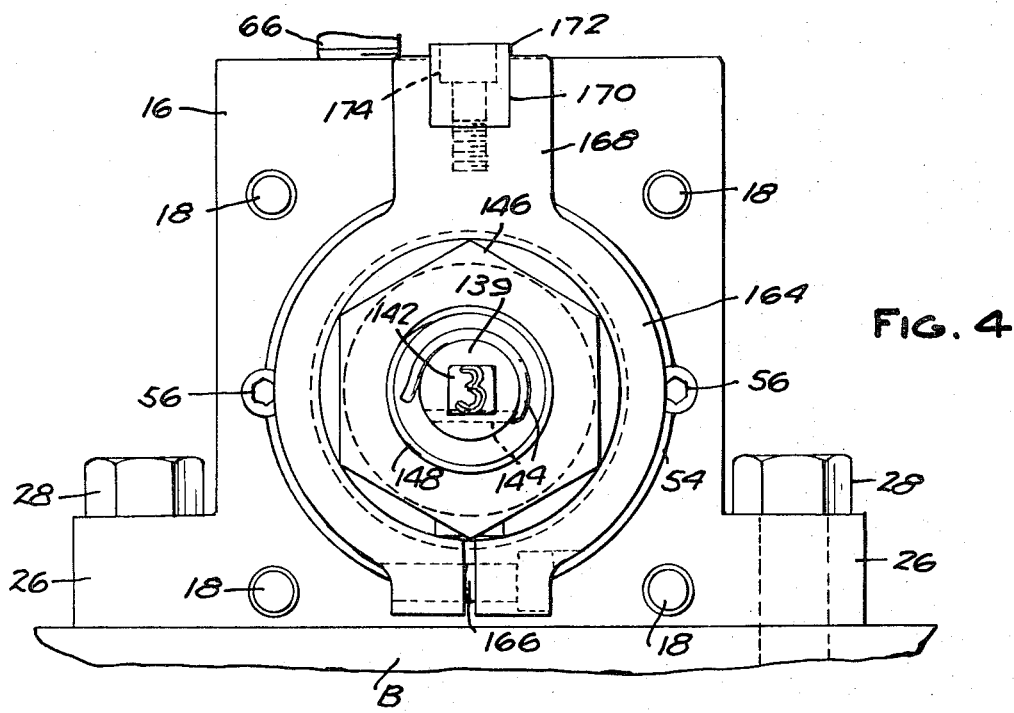
FIG. 4 is a front elevational view of the marking tool.
Figure 5:
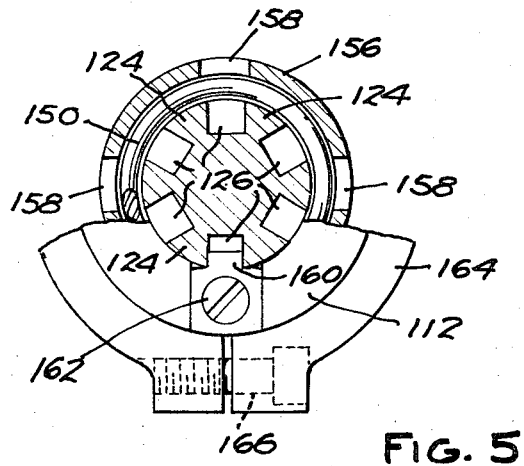
FIG. 5 is a sectional view on line 5—5 of FIG. 2.

Shown in the drawings is a marking tool 10 according to the present invention. The marking tool has an outer pneumatic cylinder 12 to the ends of which heads 14 and 16 are secured by tie bolts 18 and nuts 20 thereon. O-ring seals 22 are provided between heads 14, 16 and the ends of the cylinder. The heads are provided respectively with flanges 24 and 26 secured as by bolts 28 to a base B.

A piston 30 is pneumatically movable within cylinder 12 and the piston carries seal rings 32 slideably engaging the interior wall 34 of the cylinder. A piston rod 36 is secured to piston 30 by such means as bolting 38. The piston rod has an end portion 48 which projects slideably through an opening 50 in head 16 and an opening 52 in a bushing 54 secured to head 16 by cap screws 56. Bushing 54 serves as a retainer for a seal ring 58 slideably engaged with piston portion 48.

Heads 14, 16 are provided respectively with ports 60, 62 through which air under pressure is introduced into cylinder 12 at opposite sides of piston 30 for advancing and retracting the piston. The ports are tapped to receive threaded nipples 64, 66 on compressed air lines 69, 70 connected with a conventional 4-way valve 72 having an inlet port 74 connected with a source of air under pressure and an outlet port 76 to atmosphere. A conventional speed control valve 77 is provided in air line 70.

Piston rod 36 is hollow and defines an inner pneumatic cylinder 78. A ram 80 is pneumatically movable within cylinder wall 78. Piston 30 has a port 82 through which air under pressure passes between the interiors of cylinders 12 and 78 at one side or end 84 of ram 80. An O-ring seal 86 surrounds port 82 and is engaged by ram end 84 in the position of FIG. 1. The wall of piston rod 36 has a lateral port 88 to admit air under pressure from cylinder 12 into cylinder 78.

Speed control valve 77 has a ball check 90 around which is a shunt 92 with a restriction 93 the size of which is controlled by a metering screw 94. Check valve 90 is arranged to pass air under pressure through air line 70 into cylinder 12 and to prevent a flow of air therethrough in the opposite direction. Air exhausting from cylinder 12 through air line 70 must pass through metered restriction 93.

Ram 80 has a land 96 adjacent end 84 and this land has an annular groove 98 which carries a seal ring 100 in sliding engagement against cylinder wall 78. The ram has another land 102 adjacent its end 104 opposite from end 84. Land 102 has an annular dirt groove 106.

Lands 96, 102 are in sliding engagement against cylinder wall 78. Between lands 96, 102 ram 80 is provided with an annular groove 108. This groove has such an axial extent such that when the ram is in its farthest advanced position the groove is in registry with port 88 for a purpose to be described. Vent porting is provided between axially opposed sides of land 102 and this may be done conveniently by grooving land 102 axially between annular groove 108 and ram end 104 as at 110.

A closure bushing 112 is secured within end portion 48 of piston rod 36 as by threading 114. An O-ring seal 116 is provided between bushing 112 and end portion 48. Bushing 112 has a central opening 118 within which a combined valve member and die holder 120 is axially slideably mounted. Member 120 has a shank 122 disposed within opening 118. A circumferential series of ribs 124 radiate from shank 122 and their outer surfaces are slideably engaged within opening 118. A plurality of recesses or channels 126 are provided in circumferentially alternate arrangement with ribs 124.

Shank 122 has an enlarged head 128 disposed within cylinder 78 beyond the inner end 130 of bushing 112. Inner end 130 carries an O-ring seal 132 which is engaged and disengaged by an end surface 134 of head 128 to seal and vent the interior of cylinder 78 as is brought out in greater detail below. when head 128 is retracted as shown in FIG. 2, an outlet port 135 is created between surface 134 and seal 132. The periphery 136 of head 128 is radially spaced from inner cylinder wall 78 to provide a passageway 137 for the flow of air from the cylinder interior to and through port 135 and channels 126. The channels have downstream ends 137 which are open to atmosphere. Head 128 has an end portion 138 which faces the interior of cylinder 78 and provides an anvil positioned to be struck by end 104 of ram 80. Member 120 has an outer end portion 139 which is recessed to provide a socket 140 for carrying a marking die 142. A die 142 is removably secured within socket 140 by a spring clip 144 as is conventional.

Valve head 128 is biased toward engagement of surface 134 against O-ring 132. For this purpose a nut 146 is threaded onto a portion 148 of member 120 between shank 122 and die holder 139. A coil spring 150 is compressed between oppositely facing abutments provided by a surface 152 of nut 146 and an end surface 154 of closure 112. A spacing ring 156 surrounds spring 150 and fits with axial clearance 157 between abutments 152,154.

This clearance determines the extent of possible movement of member 120 toward the interior of cylinder 78 and thereby determines the extent to which surface 134 of head 128 can depart from seal 132. Thus, clearance 157 controls the size of port 135 and this size can be adjusted by turning nut 146. The nut is secured in its adjusted position by friction of compressed spring 150 thereagainst. Ring 156 is apertured at 158 to provide outlet ports for air exhausting from cylinder 78 past valve head 128 and through channels 126.

A key 160 is secured to closure 112 by a cap screw 162 and this key engages slideably within one of the channels 126 thereby maintaining member 120 and a marking die 142 carried thereby in a predetermined rotative orientation relative to piston rod 36. A split collar 164 is clamped around closure 112 by a bolt 166. The collar has an upward extension 168 provided adjacent its upper end with a socket 170. A bar 172 is anchored within socket 170 by a bolt or cap screw 174. This bar projects horizontally over the top of cylinder 112 and engages slideably in a way 176 formed in the top of cylinder head 16. Interengagement of bar 172 and way 176 maintains piston rod 36 and therefore, marking die 142 in a predetermined rotative orientation relative to cylinder 12 and the workpiece W to be marked by the die.

In use it will be assumed that initially the parts of marking tool 10 are in the position of FIG. 1. Air under pressure has been valved into the left end of cylinder 12 through air line 70 and port 62 so that piston 30 and piston rod 36 are retracted to the right and marking die has been withdrawn from the work station. For reasons which will appear below, air under pressure is trapped to the left of ram 80, being retained by engagement of valve head surface 134 against O-ring seal 132, and by engagement of ram 80 against O-ring seal 86.

When a workpiece W is carried by a carrier C into alignment with marking die 142, valve 72 is shifted to the position of FIG. 1 connecting the left end of cylinder 12 to exhaust port 76 and connecting the right end of cylinder 12 to inlet port 74. Piston 30, piston rod 36, ram 80, member 120 and marking die 142 are thereby moved bodily to the left as the drawings are viewed until the marking die engages workpiece W, the moving parts remaining in the relative position shown in FIG. 1. Since the exhausting air must pass through restriction 93, movement of piston 30 is resisted and pressure is maintained in the left portions of cylinders 12 and 78.

When the marking die engages the workpiece, its movement and that of member 120 is halted but movement of piston 30 and piston rod 36 continues against the bias of compressed spring 150 until clearance 157 is taken up and the ends of ring 156 abut against surfaces 152 and 154. This independent movement of piston 30 disengages seal 132 from surface 154 of valve head 128 thereby opening port 135. The compressed air trapped between valve head 128 and ram 80 is immediately vented to atmosphere through passageway 137, port 135, channels 126 and ring openings 158. Air under pressure entering port 82 from cylinder 12 and acting on ram end 84 advances ram 80 leftward within cylinder 78 and end 104 of the ram forceably strikes the anvil end 138 of head 128. This force is transmitted through the length of member 120 to marking die 142 causing the die to mark workpiece W.

Valve 72 is now shifted to connect air line 68 with exhaust port 76 and to connect air line 70 with inlet port 74; air in line 70 unseats ball 90 and flows into cylinder 12; and piston 30 begins to retract piston rod 36 to the right. During an initial fraction of this movement, member 120 is held stationary by spring 150 and seal 132 is returned into engagement with surface 134 of valve head 128 thereby closing port 135 and isolating from atmosphere the portion of cylinder 78 to the left of ram 80.

The compressed air admitted into cylinder 12 for retracting piston 30 flows from cylinder 12 through port 88 into cylinder 78. At this time axially elongate groove 108 in ram 80 is in registry with port 88, that is to say, land 96 on the ram is to the right of port 88 while land 102 is to the left of port 88. The compressed air thus enters the space between groove 108 and cylinder wall 78 and acts against land 96 which serves as a piston. Seal 100 enhances the piston function of land 96. The compressed air forces ram 80 to the right causing ram end 84 to seat against seal 86 around port 82. This prevents further escape of air from within cylinder 78 through port 82. Vent grooves 110 pass air from groove 108 to the left of land 102 to facilitate rightward movement of the ram.

Valve 72 is left in its piston-retraction position until the subsequent cycle of operation of tool 10. Compressed air is retained within the left end of cylinder 12 and is retained within cylinder 78 by seals 86,132. This insures that ram 80 will remain in its fully retracted position until port 135 is again opened so that the ram will accelerate through its full stroke under the impetus of air entering port 82 before the ram strikes anvil 138.

Tool 10 functions in the manner described each time that a new workpiece W is advanced to the marking station by carrier C. Conventional automatic and/or manual controls (not shown) are provided for coordinating operation of valve 72 with movements of carrier C. The size of restriction 93 is adjustable by turning metering screw 94 to control the velocity of advancement of piston 30.

Bar 172 and key 160 cooperate with their respective ways to maintain die 142 in its correct rotative orientation with respect to workpiece W. Reciprocating movement of bar 172 may be utilized to actuate controls such as limit switches associated with carrier C and valve 72.

The structure and functioning of tool 10 is relatively simple, inexpensive and automatic. Advancement of piston 30 causes the marking mechanism to be advanced bodily to a position for marking a surface S of the workpiece which in many cases is recessed as shown. Before carrier C can be moved the marking mechanism must be withdrawn bodily to retract marking die 142 from the recess. This is accomplished by retraction of piston 30.

In the conventional marking tool, the marking die is carried by a piston and piston rod assembly having relatively small mass and the assembly must be moved at a relatively high velocity to accomplish the marking. This results in a loud noise when the die strikes the work. Moreover, frequently the work is held somewhat loosely in its fixture which results in a double impact noise when the die strikes the work and when the work thereafter strikes a part of its fixture.

In contrast, piston 30 advances toward the work at a relatively slow rate and compression of spring 150 after engagement of die 142 against the work cushions the impact of the die against the work to the extent that no significant noise results. Should the workpiece be loose in its fixture, it becomes firmly seated therein without significant noise by the force of spring 150 acting through die 142.

Ram 80 is preferably substantially more massive than the piston and piston rod assembly of a conventional marking tool. Consequently, the ram is capable of imparting sufficient force for marking the workpiece while traveling at a substantially lower velocity than the conventional piston and piston rod assembly. The pneumatic circuitry in and for tool 10 is arranged to propel the ram at such lower velocity resulting in materially reduced noise when the ram strikes anvil 138. Moreover, the sound is muffled since the impact occurs within cylinder 78.

In the conventional marking tool compressed air is exhausted from the cylinder directly to atmosphere resulting in an objectionably high level of sound. In marking tool 10 the air venting from cylinder 78 through port 135 enters channels 126 which have a total cross sectional area which is large as compared to the area of port 135. These channels cooperate to form an expansion chamber and it will be noted that a major portion of channels 126 is within closure 112. Thus, the venting air expands within the tool and by the time the air exits to atmosphere through downstream ends 127 of the channels and through openings 158 it is traveling at a relatively slow velocity. The noise of the air exhausting from the tool is materially reduced.

A marking tool 10 according to the invention operates at a sound level which is nonhazardous to the human ear unprotected by protective gear.

I claim:

1. Marking tool structure which comprises,
    a first pneumatic cylinder with a piston and piston rod therein, a portion of the rod projecting beyond an end of the cylinder,
    said rod being hollow and defining a second pneumatic cylinder,
    vent means between the interior of said second cylinder and atmosphere,
    a member axially movable in said rod portion between one position in which it pneumatically closes said vent means and another position in which it opens said vent means,
    said member being biased toward said one position,
    means providing a marking die holder mounted for movement with said member,
    said first cylinder being ported to receive air under pressure for advancing and retracting said piston relative to a workpiece,
    said holder being effective to move said member against said bias to said other position responsive to engagement of a marking die held thereby with a workpiece,
    said member being provided with means forming an anvil,
    a ram pneumatically movable in said second cylinder,
    said second cylinder being provided with first porting to receive air under piston-advancing pressure from said first cylinder, and second porting to receive air under piston-retracting pressure from said first cylinder,
    said ram, responsive to opening of said vent means being advanceable under the force of air under pressure received through said first porting for striking said anvil,
    said member being effective to transmit striking force of said ram against said anvil to said holder and a marking die held thereby for marking a workpiece,
    said ram being retractable in said second cylinder under the force of air under pressure received through said second porting,
    and pressure retaining means associated with said first porting cooperable with said member in said one position to retain air under pressure in said second cylinder received through said second porting.

2. The structure defined in claim 1 wherein said pressure retaining means comprises seal means associated with said first porting.

3. The structure defined in claim 2 wherein said first porting comprises a passageway through said piston having an end which opens into said second cylinder, said seal means surrounding said end and being engaged by said piston and ram in retracted position of said ram.

4. The structure defined in claim 3 wherein said second porting comprises an opening through a side wall of said cylinder.

5. The structure defined in claim 3 wherein said seal means comprises an O-ring, said second porting comprising an opening through a side wall of said second cylinder displaced from said O-ring by at least the length of said ram.

6. The structure defined in claim 1 wherein said first and second porting comprise respectively a passageway through said piston and an opening through a side wall of said second cylinder,
    said pressure retaining means comprising a seal around said passageway engaged by said ram and piston in retracted position of said ram,
    said ram having two axially spaced circumferential lands and an annular groove therebetween,
    one of said lands being adjacent said piston in retracted position of said ram and carrying an annular seal slideably engaged with the interior of said second cylinder,
    said groove being in registry with said opening in fully advanced and partially retracted positions of said ram and being out of registry with said opening in fully retracted position of said ram.

7. The structure defined in claim 6 wherein said ram is provided with venting between said groove and portions of the interior of said second cylinder at the side of the other of said lands opposite to said groove to facilitate retraction of said ram.

8. The structure defined in claim 7 wherein said other land is grooved to provide said venting.

9. The structure defined in claim 7 wherein a closure bushing is threaded into the interior of said rod portion, said bushing having a substantially central, axially extending aperture one end of which opens into said interior of said second cylinder and the other end of which is open to atmosphere,
a seal on said bushing which surrounds said one end of said aperture,
said member having a shank with a plurality of radial ribs slideably engaged against the bushing wall defining said aperture, said shank having a plurality of grooves between at least certain of said ribs providing vent passageways defining in part said vent means,
a head on said shank disposed within said interior and having a portion facing said ram which provides said anvil,
said head having another portion engaged with said seal in said one position of said member so to close said vent passageways, said other head portion being disengaged from said seal in said other position to provide a port for so opening said vent passageways,
said head having a peripheral portion radially spaced from the interior wall of said second cylinder to facilitate venting flow of air into said port,
said vent passageways having a combined sectional area which is large as compared to that of said port to provide expansion chamber means within said bushing.

10. The structure defined in claim 1 wherein said rod portion has a closure with an opening which provides said venting means, said member being so movable in said opening.

11. The structure defined in claim 10 wherein said member has a head within said interior, a portion of which provides said anvil.

12. The structure defined in claim 11 wherein said head has another portion which is effective so to close and open said opening.

13. The structure defined in claim 10 wherein said member has a head within said interior, a portion of which is effective so to close and open said opening.

14. The structure defined in claim 13 wherein said closure has a portion which faces said head portion, and a seal engaged by said portions in said one position of said member to so close said opening.

15. The structure defined in claim 14 wherein said closure portion surrounds an end of said opening, and passageway means for venting flow of air past said head into said end in said other position of said member.

16. The structure defined in claim 15 wherein said passageway means comprises radial spacing between said member and the interior wall of said second cylinder.

17. The structure defined in claim 10 wherein said member has a shank with first portions slideably engaged in said opening, said shank having second portions defining passageway means for flow of air from said interior to atmosphere.

18. The structure defined in claim 17 wherein said first portions comprise a plurality of ribs and said second portions comprise a plurality of grooves between said ribs.

19. The structure defined in claim 18 and including in addition a key on said closure axially slideably engaged within one of said grooves to maintain said member in a predetermined circumferential orientation in said opening.

20. The structure defined in claim 19 wherein axially slideably interengaged means are mounted on said rod portion and first cylinder effective to maintain said second cylinder in a predetermined circumferential orientation relative to said first cylinder.

21. The structure defined in claim 20 wherein said closure has a laterally projecting arm which provides the mounting for one of said interengaged means.

22. The structure defined in claim 10 wherein said member has an abutment between said holder and closure, said bias being provided by a spring stressed between said abutment and closure, and spacer means between said abutment and closure which limits the range of movement of said member from said one position to said other position.

23. The structure defined in claim 22 wherein said spring comprises a compressed coil spring and said spacer means comprises a ring which surrounds said spring.

24. The structure defined in claim 23 wherein said ring is apertured to pass air venting from said interior of said second cylinder.

25. The structure defined in claim 1 wherein said rod portion is provided with means defining a valve port which is opened responsive to movement of said member to said other position to so vent said interior, vent passageway means communicating with said port at one location and being open to atmosphere at another location,
said port and vent passageway means cooperating to define said vent means,
said vent passageway means having an effective cross sectional area which is large as compared to that of said port in open condition to form expansion chamber means between said locations.

26. The structure defined in claim 25 wherein said passageway means comprises spacing between surface portions of said member and surface portions within said rod.

27. The structure defined in claim 26 wherein said surface portions of said member are disposed within said surface portions of said rod portion.

28. The structure defined in claim 27 wherein said surface portions of said member comprise grooving in said member.

29. The structure defined in claim 28 wherein said grooving comprises a plurality of circumferentially arranged grooves which extend substantially parallel to the direction of movement of said member.

30. The structure defined in claim 1 wherein first slideably engageable means are mounted on said first cylinder and rod portion and second slideably interengaged means are provided on said rod portion and member, said interengaged means being cooperable to maintain said member in a predetermined angular orientation relative to said first cylinder.

31. The structure defined in claim 1 wherein a closure bushing is threaded into the interior of said rod portion, said bushing having a substantially central, axially extending aperture one end of which opens into said interior of said second cylinder and the other end of which is open to atmosphere, a seal on said bushing which surrounds said one end of said aperture, said member having a shank with a plurality of radial ribs slideably engaged against the bushing wall defining said aperture, said shank having a plurality of grooves between at least certain of said ribs providing vent passageways defining in part said vent means, a head on said shank disposed within said interior and having a portion facing said ram which provides said anvil, said head having another portion engaged with said seal in said one position of said member so to close said vent passageways, said other head portion being disengaged from said seal in said other position to provide a port for so opening said vent passageways, said head having a peripheral portion radially spaced from the interior wall of said second cylinder to facilitate venting flow of air into said port, said vent passageways having a combined sectional area which is large as compared to that of said port to provide expansion chamber means within said bushing.

32. In combination with the structure defined in claim 1, pneumatic circuitry which includes valving adapted to connect portions of said first cylinder at opposite sides of said piston alternatively with a source of air under pressure and exhaust.

33. The combination defined in claim 32 wherein said valving comprises a 4-way valve.

34. The combination defined in claim 33 wherein said circuitry includes a restriction to the flow of air which is adjustable to regulate the speed of piston advancement in said first cylinder.

35. The combination defined in claim 34 wherein said circuitry includes an air line through which piston retracting pressure is conducted from said valve to said first cylinder, a check valve in said air line openable responsive to piston retracting pressure therein and closeable responsive to pressure in the opposite direction, a pneumatic bypass around said check valve, said restriction being provided in said bypass.

* * * * *